March 21, 1933.  H. EVANS  1,902,279
STONE CUTTING MACHINE
Filed July 29, 1932    9 Sheets-Sheet 1

Inventor:
Harold Evans,
by Robert Kalver,
Att'ys.

March 21, 1933.  H. EVANS  1,902,279
STONE CUTTING MACHINE
Filed July 29, 1932   9 Sheets-Sheet 7

Inventor:
Harold Evans,
by Calvert Kalvin
Att'ys.

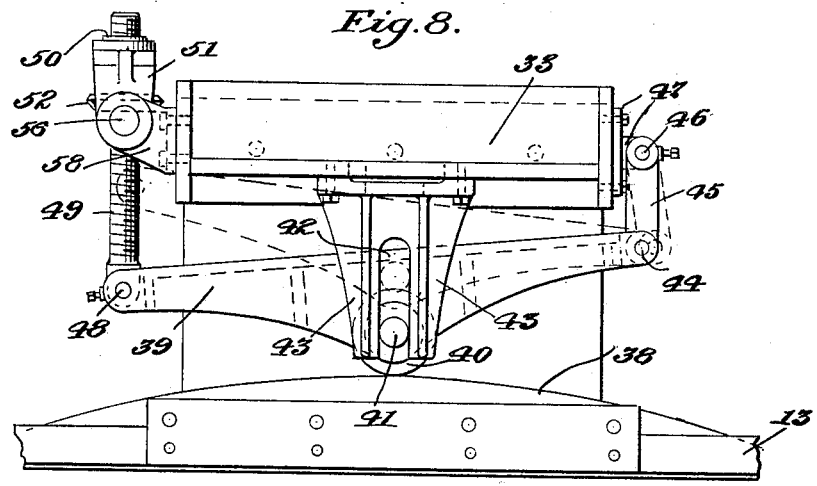

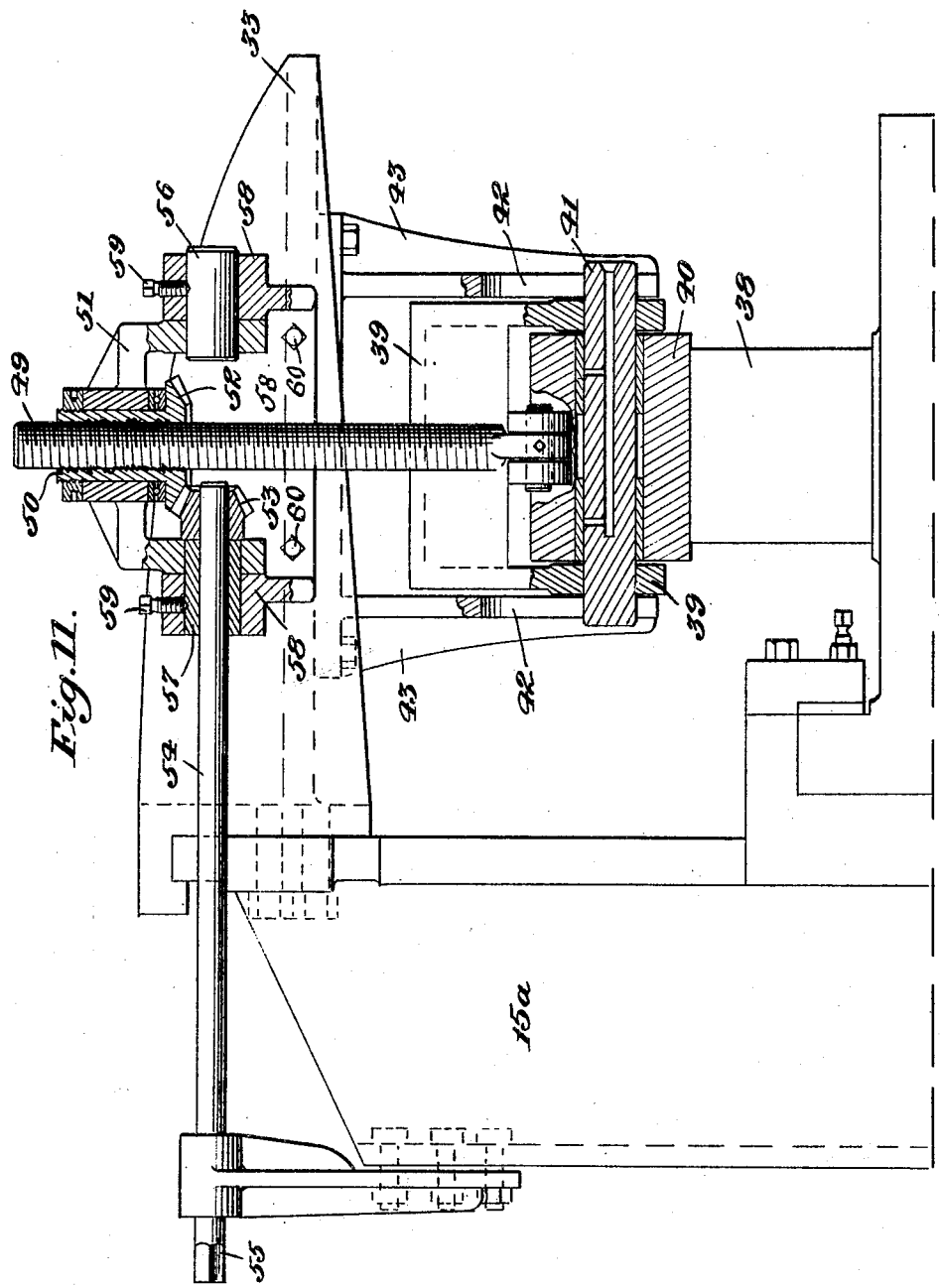

Patented Mar. 21, 1933

1,902,279

UNITED STATES PATENT OFFICE

HAROLD EVANS, OF NIAGARA FALLS, ONTARIO, CANADA, ASSIGNOR TO POLLARD MACHINERY COMPANY, INC., OF NIAGARA FALLS, NEW YORK, A CORPORATION OF NEW YORK

STONE CUTTING MACHINE

Application filed July 29, 1932. Serial No. 626,105.

This invention relates to certain improvements in stone cutting machines comprising carborundum abrasive cutting wheels mounted on carriages travelling over the work and which cutting wheels may be adjusted up and down as is necessary when the machines are in use. Heretofore in machines of this class the adjustments to raise or lower the cutting wheels have been performed manually by the operator who must first stop the travel of the carriage and then climb up on the work table to effect this manual adjustment. The present invention provides means whereby this adjustment can be performed mechanically by suitable gearing connected with an electric motor and which may be controlled by the operator from a remote position.

The invention also comprises means which enables the machine to produce concave or convex profile work, or work of any desired profile, within the limits of the machine, all as will hereinafter be fully set forth.

Figure 1:
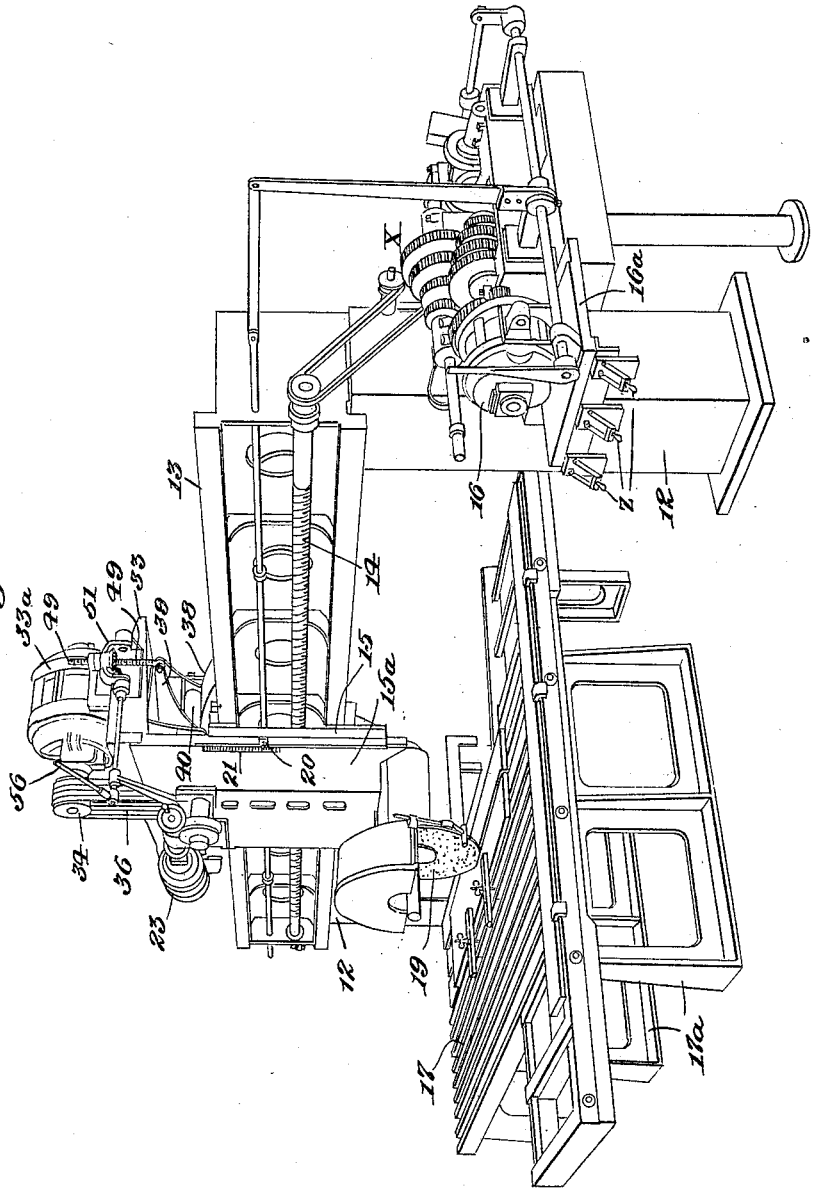
Figure 2:
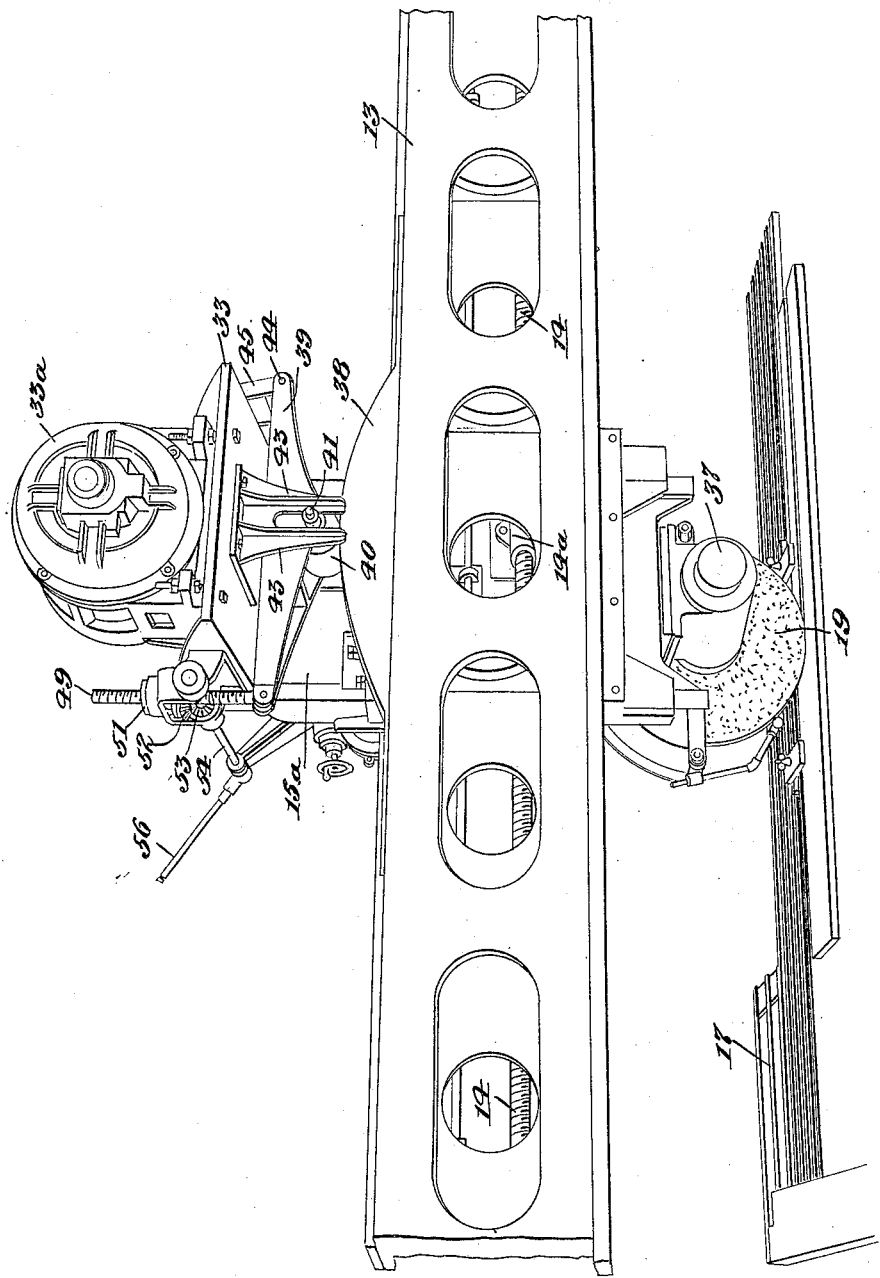
Figure 3:
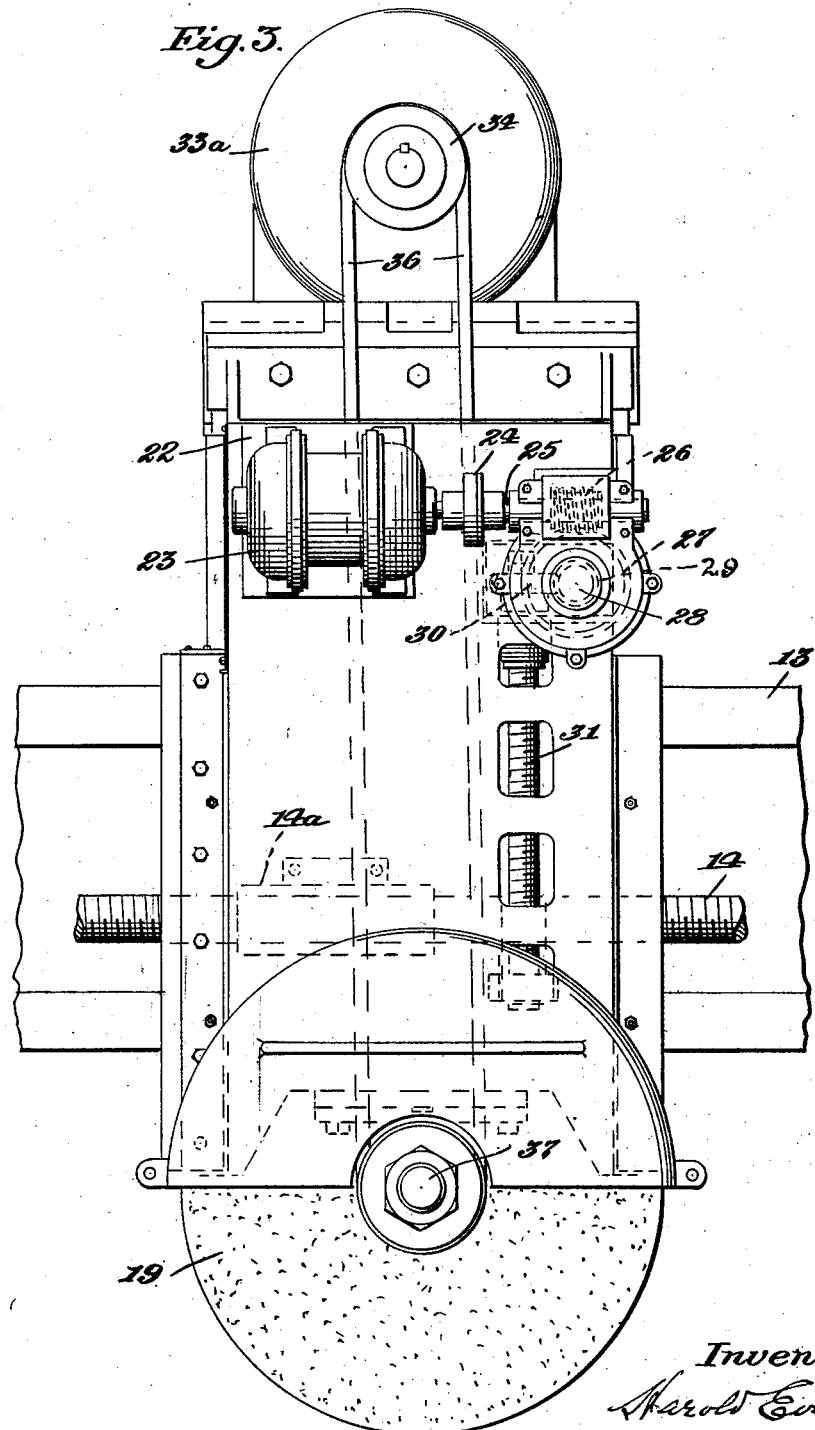
Figure 4:
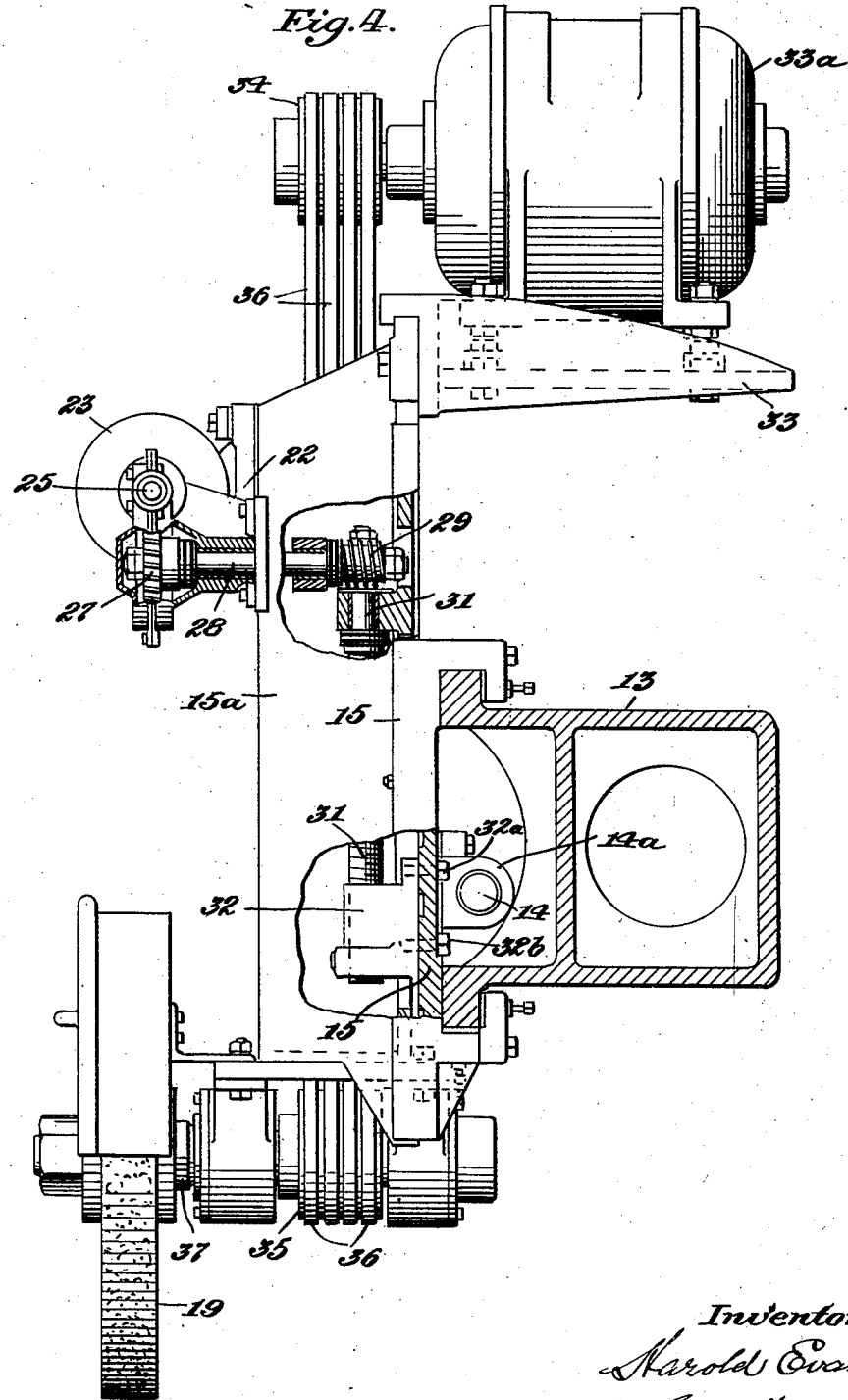
Figure 5:
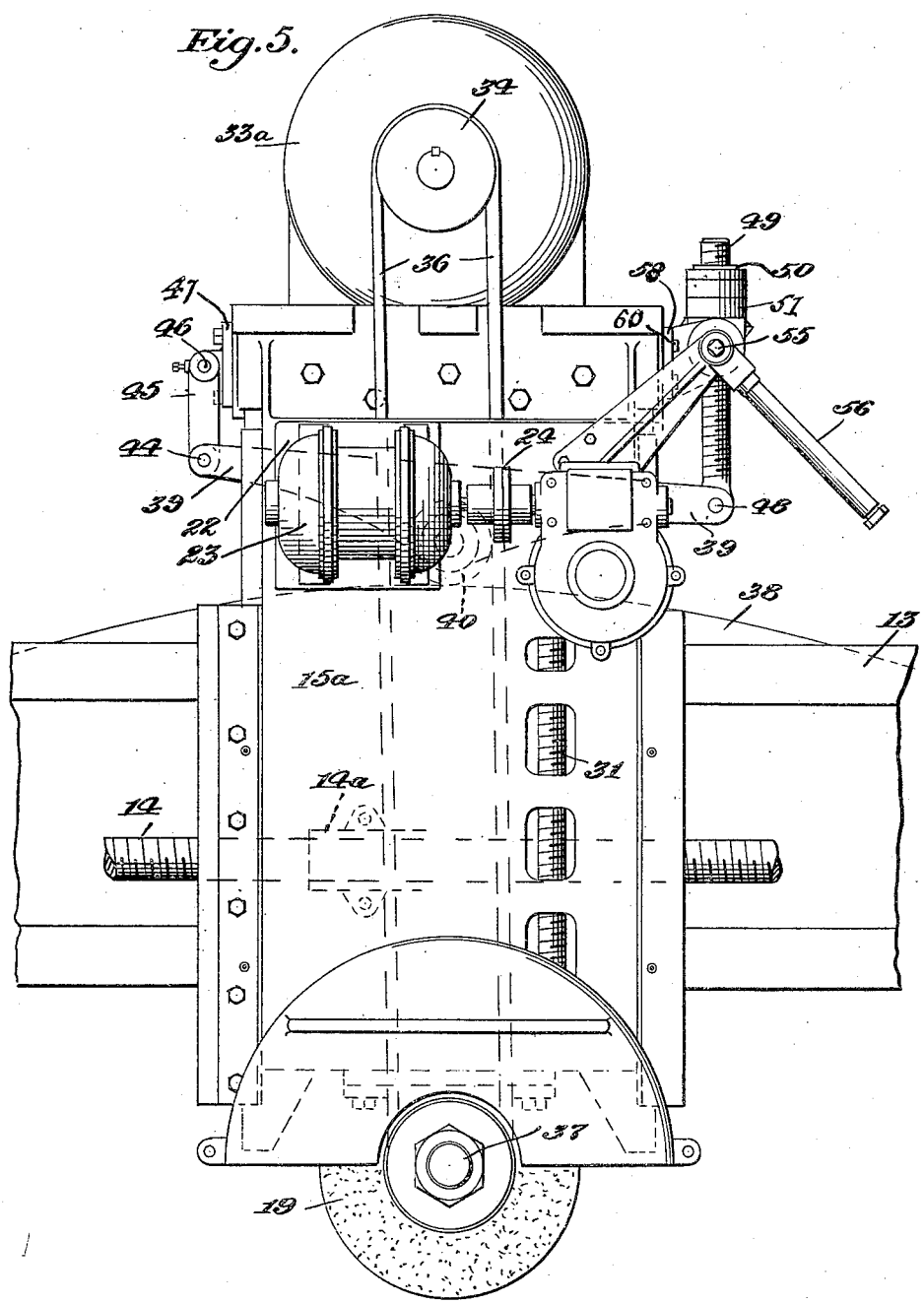
Figure 6:
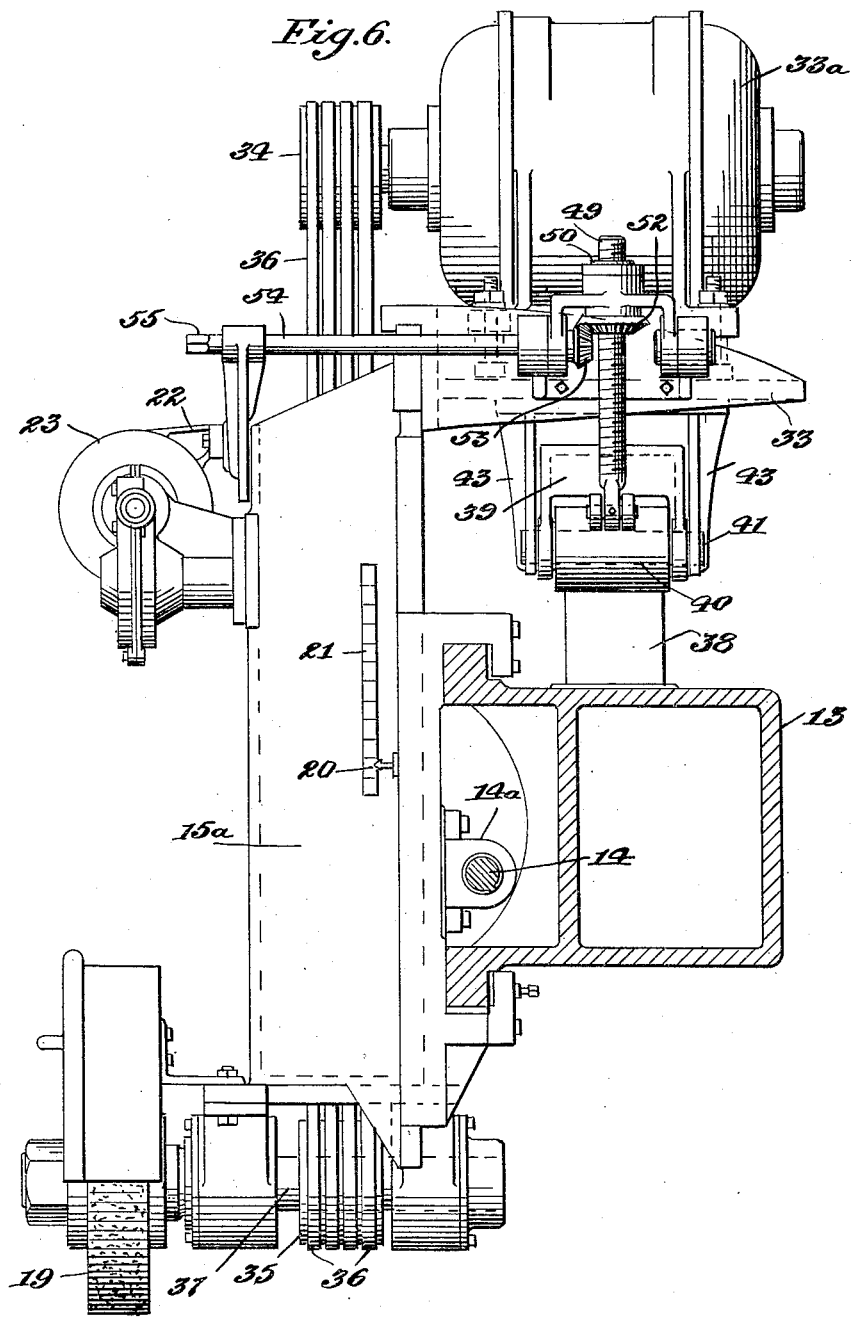
Figure 7:
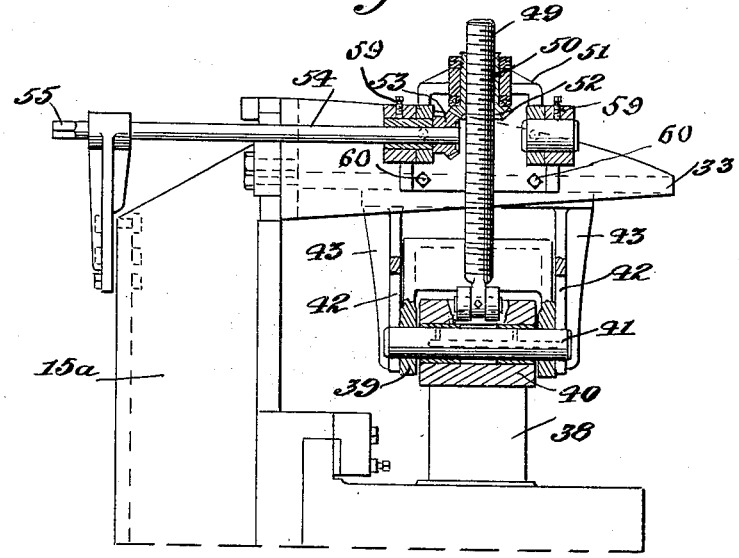
Figure 10:
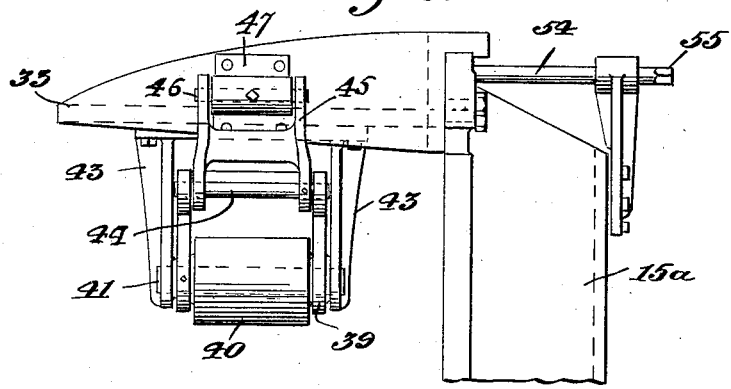

In the accompanying drawings Fig. 1 is a perspective view of a stone cutting machine embodying the present invention. Fig. 2 is a partial perspective view of the same looking from the back of the machine. Figs. 3 and 4 are front and side elevations, respectively, showing the cutting head and the gearing for raising and lowering the same and other parts carried thereby, and also showing, in part, the cross beam on which the cutting wheel travels. Figs. 5 and 6 are front and side elevations of the cutting head showing the profiling attachment in place. Fig. 7 is a sectional view of the profiling mechanism, and Fig. 8 is an elevation thereof. Fig. 9 is a plan view of the same, and Fig. 10 is an elevation looking in a direction opposite to Fig. 7 and showing, in elevation, some parts in section in Fig. 7. Fig. 11 is similar to Fig. 7 but showing some parts omitted from Fig. 7.

Referring to the drawings, 12 denotes standards which support a cross beam 13 on which is mounted a feed screw 14 driven from an electric motor 16 mounted on a table 16ª through a suitable reversible gearing generally denoted by X. The feed screw 14 passes through a nut 14ª on a carriage 15 movable over a platen or table 17 resting on a suitable supporting frame 17ª. Mounted in suitable guideways on the carriage 15 is a vertically movable cutting head 15ª with which the cutting wheel 19 is connected so that said cutting wheel may be adjusted up and down, as is necessary in the cutting operations. One of these guideways is preferably provided with a fixed index or pointer 20, and the cutting head 15ª is also preferably provided with a graduated scale 21 movable adjacent to said pointer, said pointer and scale being convenient in indicating different vertical adjustments of the cutting head 15ª and the cutting wheel 19 and the adjusting and driving mechanism movable vertically therewith.

Attached to the cutting head 15ª is a bracket 22 on which is mounted a small electric motor 23 the shaft of which is connected by a "Grundy" or other flexible coupling 24 with a worm shaft 25 carrying a worm 26. The worm 26 meshes with a worm wheel 27 on a shaft 28 carrying a worm 29 which, in turn, meshes with a worm wheel 30 on a screw shaft 31. The screw shaft 31 extends through a nut 32 fixed to the carriage or saddle 15. Thus when the screw shaft 31 is rotated by the electric motor 23 through the reducing gearing just described a vertical movement will be imparted to said screw mounted on the cutting head 15ª and to the other parts mounted on said cutting head.

These other parts, vertically movable with the cutting head 15ª, include a bracket 33, fixed to the upper part of the said cutting head and on which bracket is mounted an electric motor 33ª which drives the cutting wheel 19 through pulleys 34 and 35, belts 36 and shaft 37.

From the foregoing it will be understood that vertical movements of the cutting wheel 19 may be imparted thereto from the motor 23, and that said motor can be controlled by a manually operated switch, as one of the switches at Z, located at any convenient point distant from the vertically movable head with which the cutting wheel is connected.

In much stone cutting work, as in cutting large pieces of stone into slabs of any desired width, the cutting wheel will be caused to travel in a straight horizontal line. It is, however, sometimes desirable to cut stone in various profile shapes, as in making convex, concave, or other shaped surfaces. To this end the cutting head 15$^a$, with which the cutting wheel is connected, must be given certain vertical movements as the cutting wheel moves over the work-supporting platen or table 17, and such movements will cause the cutting wheel to travel in lines which deviate from straight horizontal lines. This vertical component of the motion of the cutting wheel can be effected by means now to be described.

Mounted on the cross beam 13 is a template or pattern plate 38 which, as herein shown, is of convex form. Mounted to travel over the template 38 is a roller 40 the axis pin 41 of which has bearings in a frame 39 and said pin extends into slots 42 in brackets 43 attached to the lower side of the motor-supporting bracket 33. The frame 39 is attached at one end by a pivot pin 44 to a link 45 the upper end of which is connected by a pin 46 to a bracket 47 attached to the motor supporting bracket 33. The frame 39 is connected, by a pin 48, at its end opposite the pin 44, to the lower end of a screw 49 extending upward through a nut 50 in a bracket or frame 51. The bracket or frame 51 is free to swivel or rock laterally about pins or sleeves 56 and 57. These pins or sleeves are rigidly fixed to bracket 58, as by set screws 59, and said bracket 58 is secured by bolts 60, or otherwise, to the motor-supporting bracket 33 which, in turn, is mounted on the vertically movable cutting head 15$^a$ which carries the cutting wheel 19.

From the foregoing it will be understood that as the roller 40 passes over the template 38 the said cutting wheel will travel in a path corresponding to the contour of the said template and will therefore give to the work a profile or outline corresponding in shape to the said template. The link connection of the frame 39 with the rigidly mounted bracket 47, also the swivel bracket 51 for the nut 50 which receives the screw 49, enables the frame 39 to adopt its movements to the vertical movements of the roller 40 the axis pin of which extends into the vertical slots 42 of the brackets 43, thus preventing the parts from binding.

It is seldom possible or practical to remove all of the material necessary to obtain the desired profile on a piece of work by one cut. Therefore it is necessary to feed the wheel progressively deeper after each forward and return traverse motion of the cutting head until the desired dimension for the work is obtained. To this end manually operated connections for controlling the vertical position of the travelling cutting head 15$^a$ are provided. Referring to Figs. 7 and 11 it will be seen that the nut 50, through which the screw 49 passes, is provided with a bevel gear 52 with which meshes a pinion 53 on a shaft 54 provided at its outer end with a squared portion 55 to which is fitted a hand lever 56 which may be grasped by the operator to operate the shaft 54 and thus, through the gearing just described, the screw 49 can be turned more or less, as may be desired, to raise or lower the cutting head 15$^a$ and the cutting wheel 19 movable vertically therewith. Said screw 49 is connected with the guide roller 40, so that a change in the distance between the center of the guide roller 40 and the center of the cutting wheel 19 is effected by turning the shaft 54 manually. Instead of the hand lever 56 the shaft 54 might be manually operated by a hand wheel mounted on the squared end 55 of said shaft.

When adapting the machine for doing convex or concave profile work, determined by the shape of a template, it is of course necessary to transfer the control of the vertical adjustment of the cutting head 15$^a$ from the screw 31 and the nut 32, which are driven by motor 23, to the guide roller 40 and the hand lever 59. This is accomplished by merely removing the cap screws 32$^a$ and 32$^b$, thus releasing the nut 32 from the carriage or saddle 15 and allowing the cutting head 15$^a$ to float on the guide roller which, in turn, is supported by a template 38 on the cross beam 13.

It will of course be understood that the electric motors 16 and 33$^a$, as well as the motor 23, can be controlled from the switches Z.

The invention is not to be understood as being limited to all the details of construction shown and described, as wide variations, within the province of mechanical skill, may be made without departing from the scope of the invention as defined by the claims hereunto appended.

Having thus described my invention, I claim and desire to secure by Letters Patent:

1. In a stone cutting machine, the combination with a travelling cutting wheel mounted for vertical movements, of a profiling mechanism whereby said cutting wheel may be automatically caused to follow any predetermined path of movement in cutting profile figures, said profiling mechanism comprising a template and a guide roller movable over said template and operatively connected with said cutting wheel to control its vertical movements, and manually operable adjusting means whereby the center distance from the guide roller to the center of the cutting wheel may be progressively increased after each forward and reverse pass of the cutting wheel, the cutting wheel thus always moving in conformity to the template as it is progressively lowered until the desired depth or profile is produced.

2. In a stone cutting machine, the combination with a travelling frame or carriage, of a cutting head mounted for vertical movements on said carriage, a cutting wheel mounted on said cutting head, a shaft journalled in said cutting head by which said cutting wheel is carried, a pulley mounted on said shaft, a second shaft journalled in said cutting head and provided with a pulley, driving means connecting said pulleys, an electric motor, also mounted on said cutting head, for driving said last-named shaft, a bracket mounted on said cutting head, a shaft journalled in said bracket, an electric motor for driving said shaft, and gearing, driven from said last-named motor, whereby said cutting head and the cutting wheel carried thereby may be raised and lowered.

3. In a stone cutting machine, the combination with a travelling frame or carriage, of a cutting head mounted for vertical movements on said carriage, a cutting wheel mounted on said cutting head, a shaft journalled in said cutting head by which said cutting wheel is carried, a pulley mounted on said shaft, a second shaft journalled in said cutting head and provided with a pulley, driving means connecting said pulleys, an electric motor, also mounted on said cutting head, for driving said last-named shaft, a bracket mounted on said cutting head, a shaft journalled in said bracket, an electric motor for driving said shaft, gearing, driven from said last-named motor, whereby said cutting head and the cutting wheel carried thereby may be raised and lowered, and a remote switch whereby said last-named motor may be controlled from a distance.

In testimony whereof I affix my signature.

HAROLD EVANS.